United States Patent [19]
Bach

[11] 3,967,536
[45] July 6, 1976

[54] PNEUMATIC AND HYDRAULIC POWER BRAKE APPARATUS

[75] Inventor: Lloyd Gene Bach, South Bend, Ind.

[73] Assignee: The Bendix Corporation, South Bend, Ind.

[22] Filed: May 29, 1975

[21] Appl. No.: 582,052

[52] U.S. Cl.................................. 91/371; 60/553; 91/431; 303/10
[51] Int. Cl.² ......................................... F15B 9/10
[58] Field of Search ............. 303/6 R, 10; 91/6, 28, 91/431, 370–373, 376, 391; 60/548, 553

[56] References Cited
UNITED STATES PATENTS

| | | | |
|---|---|---|---|
| 3,050,944 | 8/1962 | Schwartz et al. ................. | 91/431 X |
| 3,148,592 | 9/1964 | Schultz et al. .................... | 91/431 X |
| 3,289,547 | 12/1966 | Kytta .................................... | 91/376 |
| 3,603,209 | 9/1971 | MacDuff et al. ...................... | 91/391 |
| 3,707,112 | 12/1972 | Ewald ................................ | 91/28 X |
| 3,845,693 | 11/1974 | Meyers ................................ | 91/371 |
| 3,935,709 | 2/1976 | Mathues et al. ............... | 91/391 R X |

Primary Examiner—George E. A. Halvosa
Assistant Examiner—Douglas C. Butler
Attorney, Agent, or Firm—Leo H. McCormick, Jr.; William N. Antonis

[57] ABSTRACT

A power braking apparatus having a housing with a cavity therein through which a fluid under pressure is continually flowing. A piston separates the cavity into an inlet chamber and an outlet chamber. The piston has a passageway for connecting the inlet chamber from the outlet chamber. A valve in the passageway is adapted to regulate the flow of fluid from the inlet chamber to the outlet chamber. A disc located in the stem of the valve is resiliently biased against a head on the stem. One side of the disc is connected to the inlet chamber and the other is connected to the outlet chamber. An actuation input moves the valve toward a seat to restrict the flow of fluid between the inlet chamber and the outlet chamber and establish a pressure differential therebetween. This pressure differential will move the piston to provide an output force. When the pressure differential reaches a predetermined value, the resiliently biased disc on the stem will move away from the head to prevent the complete interruption of flow between the inlet chamber and the outlet chamber.

12 Claims, 3 Drawing Figures

PNEUMATIC AND HYDRAULIC POWER BRAKE APPARATUS

BACKGROUND OF THE INVENTION

In an effort to provide vehicles with an increase in braking force, a power brake booster is disclosed in U.S. Pat. No. 3,603,209 in which the hydraulic fluid utilized in the operation of a power steering apparatus may be selectively diverted to operate a power braking device. In this device a lever mechanism carried on a boost piston will respond to an input force to proportionally reduce the output of a hydraulic pump from the power steering apparatus to the power brake apparatus. In such a power boost, it may be possible to deplete or reduce the hydraulic fluid being communicated to the power steering apparatus sufficiently to cause difficulty in maneuvering a vehicle on a curving road.

Similarly in U.S. Pat. No. 3,639,008 the brake pedal is pivotally located on the power boost device to proportionally activate a valve to allow stored hydraulic fluid to be communicated to the wheel brakes to stop a vehicle. However, in such hydraulic devices the pump for pressurizing the hydraulic fluid must be sized to adequately operate both the power braking apparatus and the power steering apparatus. Therefore, there has been reluctance on the part of car manufacturers and the buying public to change either from manually operated or pneumatic pressure differential power assist brakes. However, recent congressional legislation sets forth specific stopping requirements which have limited the vehicles in which manual or pneumatic operated brakes will be acceptable.

SUMMARY OF THE INVENTION

I have devised a power braking apparatus wherein a limited quantity of the hydraulic fluid under pressure being supplied to a power steering apparatus is utilized to provide an assist in operating a master cylinder in response to an operational input.

In a first embodiment, I have established a connection between a first control valve plunger in a pneumatically operated pressure differential servomotor, and a second control valve plunger, in a hydraulic flow through apparatus located in the conduit for returning the hydraulic fluid from the power steering apparatus to a reservoir. A second control valve is located in the hydraulic flow through apparatus to separate the interior thereof into inlet chamber and an outlet chamber. The second control valve plunger has an axial passageway into which a poppet valve means is located. The poppet valve means has a resiliently positioned disc means thereon. One side of the disc means is connected to the inlet chamber and the other side is connected to the outlet chamber. Initially the poppet valve means will move as a unit to proportionally restrict the communication between the inlet chamber and the outlet chamber and create a hydraulic pressure differential between the inlet chamber and the outlet chamber. At a preselected pressure differential, the resiliently biased disc will move on the poppet valve to limit the restriction of the flow of the hydraulic fluid from the inlet chamber to the outlet chamber and prevent an interruption of the hydraulic flow in the return conduit.

It is therefore the object of this invention to provide a braking apparatus with an auxiliary hydraulic pressure differentially operated servomotor having a limiting means to assure that an operational fluid is continually flowing to a reservoir.

In a second embodiment I have attached the hydraulic flow through apparatus directly to a master cylinder and supply the operational input through appropriate linkage connected to the manually operated brake pedal on the vehicle.

It is another object of this invention to provide a braking apparatus with pneumatic and a hydraulic servomotor combination through which a master cylinder is operated.

It is a still further object of this invention to provide a control means for hydraulic power producing apparatus which is responsive to the actuation of a valve means for a pneumatic power producing apparatus in order to additively combine the outputs from both the hydraulic and pneumatic power producing apparatus.

It is a still further object of this invention to provide a poppet valve means for a hydraulic power producing apparatus having a resilient disc means which is responsive to a pressure differential caused upon the restriction of fluid under pressure being returned to a reservoir, the pressure differential being such as to overcome the resilient bias on the disc to limit the effectiveness of the restriction and prevent a complete interruption of the fluid being returned to the reservoir.

These and other objects will become apparent from reading this specification and viewing the drawings.

DETAILED DESCRIPTION OF THE PREFERRED EMBODIMENT

Figure 1:
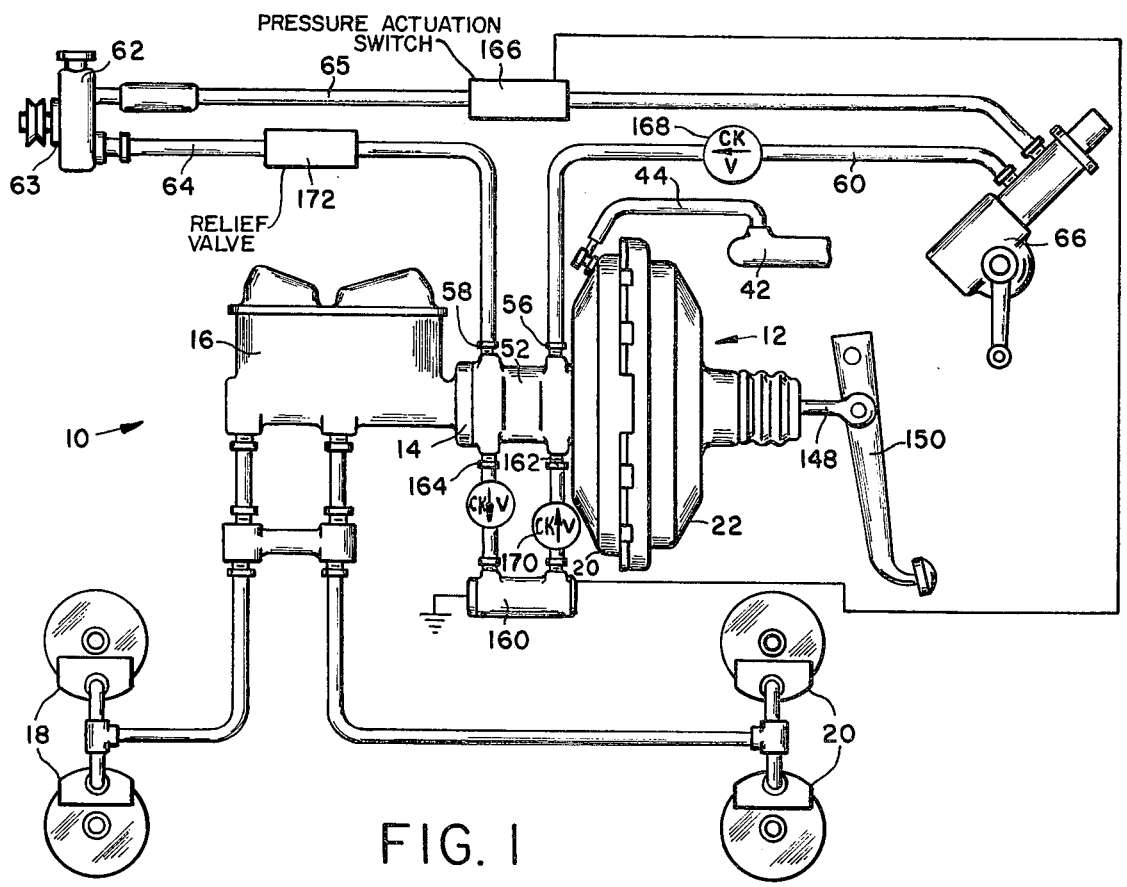
FIG. 1 is a schematic illustration of a power brake system of a pneumatic power brake apparatus connected in series with a hydraulic power brake apparatus for supplying a master cylinder with an input force.

The power braking system 10 shown in FIG. 1 has a pneumatic power assist apparatus 12 and a hydraulic power assist apparatus 14 for simultaneously providing a master cylinder 16 with an operational force. The master cylinder in response to the operational force will provide the front wheel brakes 18 and the rear wheel brakes 20 with an actuation force to brake the vehicle.

Figure 2:
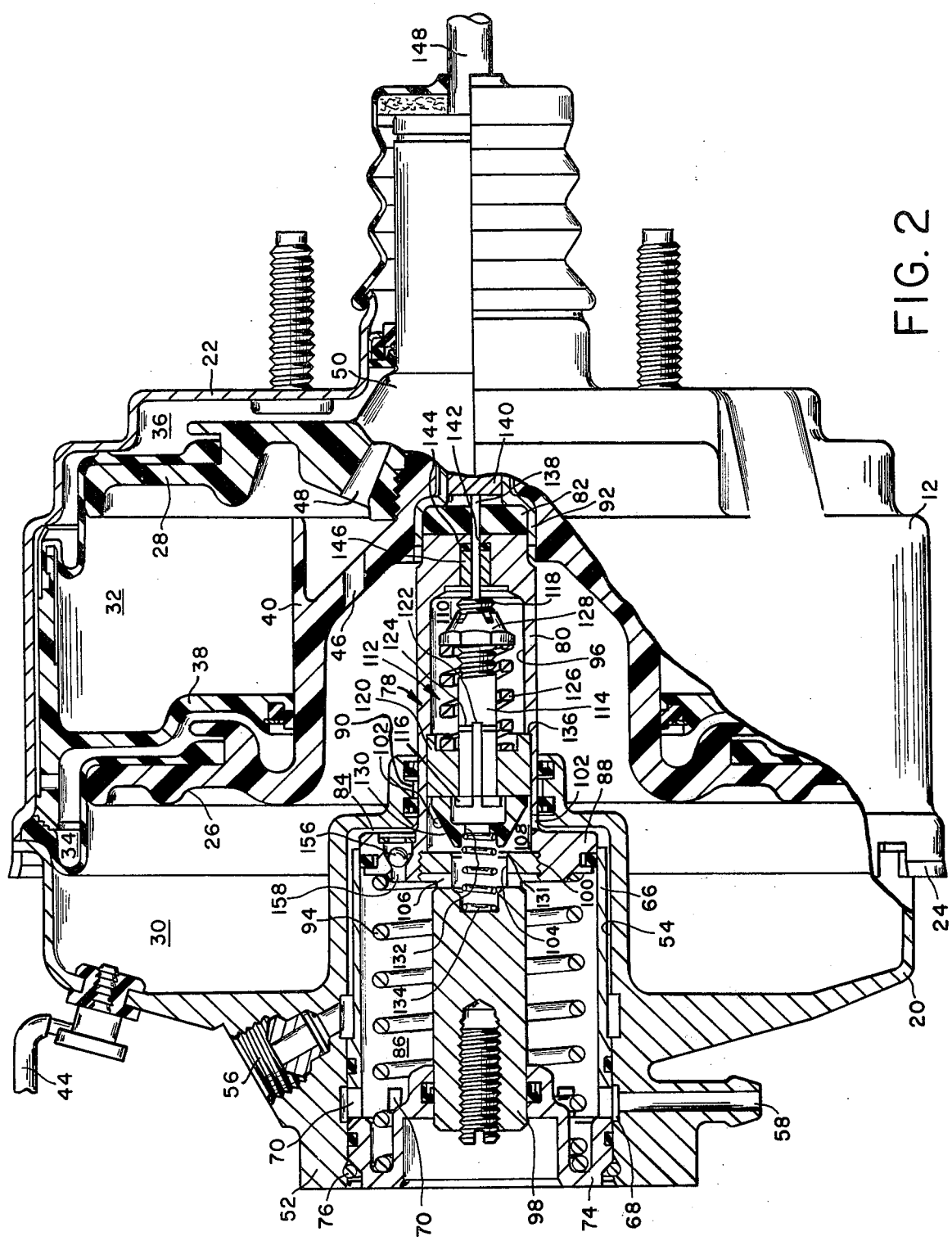
FIG. 2 is a sectional view of the pneumatic power brake apparatus connected in series with the hydraulic power brake apparatus in FIG. 1.

The pneumatic power assist apparatus 12 as shown in FIG. 2 is of the type disclosed in U.S. Pat. No. 3,289,547. In this type of servomotor, a housing is formed by a front shell 20 and a rear shell 22 which are joined together by a twist lock connection 24 to establish a closed cavity therein. A first wall means 26 and a second wall means 28 separate the cavity into a first 30 and a second 32 front chamber area and a first 34 and a second 36 rear chamber area. A partition means 38 separates the first 34 rear chamber area from second 32 front chamber area. The partition means 38 forms a guide surface for the annular section 40 which joins the first wall means 26 to the second wall means 28. The front shell 20 is connected by conduit 44 to the intake manifold 42. Vacuum, which is produced at the intake manifold 42, will evacuate air directly from the second front chamber area 32 through passage 46 and from the first 34 and second 36 rear chamber area through passage 48 and the valve means located in the hub 50.

Figure 3:
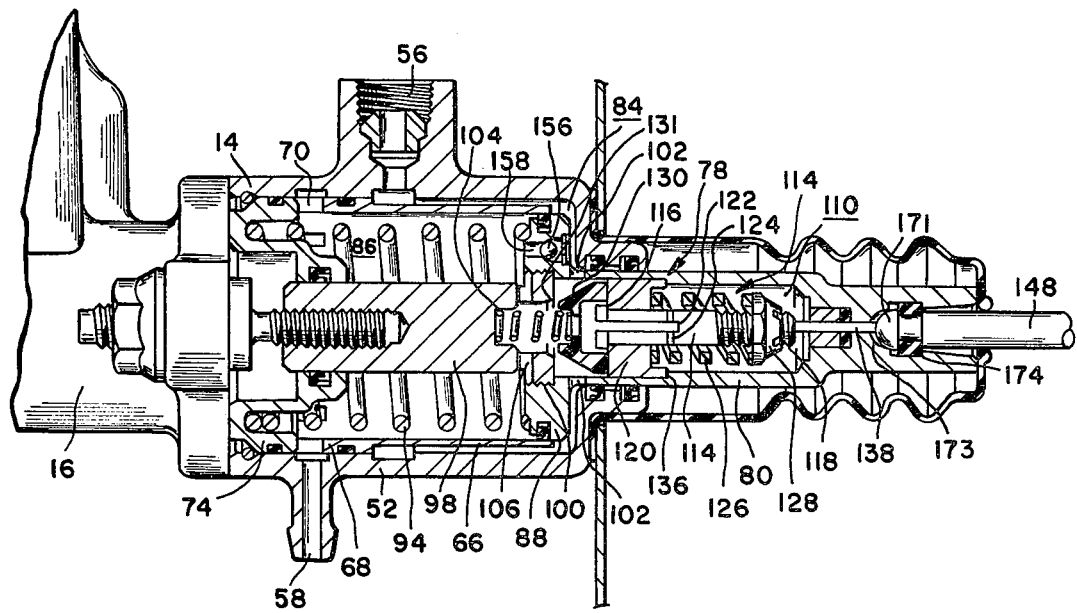
FIG. 3 is a sectional view of a hydraulic power assist responsive to an operator input for supplying an operational force to a master cylinder.

The hydraulic power assist apparatus 14 is shown in FIG. 2 as being integral with the front shell 20 of the pneumatic power assist apparatus; however, it may be desirable to provide a separate housing as shown in FIG. 3 which can be attached to the front shell 20 in order to provide a variety of combinations with existing servomotors having different diameters. The housing 52 of the hydraulic power assist apparatus 14 has an internal bore 54 with an inlet port 56 connected to an open center power steering gear 66 through conduit 60 and an outlet port 58 connected to a reservoir 62 through conduit 64. A sleeve 66 is located in the bore 54 to establish a flow path through the interior of the housing to initially direct the power steering flow toward the rear of the housing 52, and thereafter along an axial path through the cavity until being returned to the annular groove 68 in the axial bore 54 by radial openings 70. The sleeve 66 is held against end plug 74 by fluid pressure. Plug 74 is retained by wire-ring stop 76. The internal bore 54 is divided into an inlet chamber 84 and an outlet chamber 86 by a piston means 78. The piston means 78 has a cylindrical body 80 with an annular surface or land 88 which abuts the interior of the sleeve 66. The cylindrical body 80 extends through bearing surface 90 and engages the reaction disc 82 which is retained in guide 92 in the pneumatic power assist apparatus 12. A spring 94 is located in the outlet chamber 86 between the end plug 74 and the land 88 to hold the first 26 and the second 28 wall means of the pneumatic power assist apparatus against the rear shell 22. An output push rod 98 is retained in the end plug 74 and attached to the piston means 78 through threaded connection 100. The push rod 98 is adapted to be connected to the power piston (not shown) in the master cylinder 16. The piston means 78 has an axial bore 96 with a series of radial openings 102 through which the inlet chamber 84 is connected to the outlet chamber 86. The push rod 98 has a corresponding bore 104 and cross bore 106 through which the axial bore 96 is also connected to the outlet chamber 86.

The axial bore 96 is divided into a control chamber 108 and a reaction chamber 110 by a valve means 112. The valve means 112 has a stem 114 with a head 116 on a first end and a threaded section 118 on a second end. A disc 120 located on the stem 114 extends into engagement with the bore 96 to establish the boundary for the control chamber 108 and the relief chamber 110. The stem 114 has a slot 122 therein which extends from the first end to a point past the disc 120. A cross bore 124 is shown on the drawing to provide an additional flow path for communicating the slot 122 to the reaction chamber 110.

A spring 126 which surrounds the stem 114 is held against the disc 120 by a nut 128 which is adjustable on the threads 118. The nut 128 is adjusted on the threads 118 until the disc 120 engages head 116 with a predetermined force.

A poppet member 130 associated with the valve means 112 has a tapered face with an axial opening 132 therethrough. A spring 134 located in the axial bore 104 of the push rod urges the poppet member 130 against the disc 120 as shown in FIG. 2, and the disc 120 against shoulder 136. With disc 120 against shoulder 136, the threaded end 118 of the stem 114 will hold actuation pin 138 against the plunger 140 of the actuation valve (not shown) in the pneumatic power assist apparatus 12. The actuation pin 138 extends through a bearing and aligning surface 142 in the piston means 78. A seal 144, held against the housing surrounding the aligning surface 142 by a retainer 146, engages the actuation pin 138 to prevent any hydraulic fluid from being communicated from the reaction chamber 110 into the valve area of the pneumatic power assist apparatus 12.

MODE OF OPERATION OF THE PREFERRED EMBODIMENT

When an operator starts a vehicle equipped with the braking system as illustrated in FIG. 1, vacuum which is created at the intake manifold 42 will evacuate air from the pneumatic power assist apparatus 12 by flowing from the first 34 and second 36 rear chamber areas through the actuation valve out the passages 46 and 48 and into the first 30 front chamber area. With the air evacuated from the first 30 and second 32 front chamber area and the first 34 and second 36 rear chamber area, the return spring 94 can hold the first 26 and second 28 wall means against the rear shell 22.

At the same time pump 63, which is driven by a belt attached to the output shaft of the engine, will be flowing hydraulic fluid in conduit 65 for operating the open center power steering gear 66. Since power steering gear is of the open center type, the hydraulic fluid will flow in conduit 60, into the inlet chamber 84, through radial opening 102, past seat 131, and out radial holes 106 into the outlet chamber 86. From the outlet chamber 86, this hydraulic fluid will flow through openings 70 into annular groove 68 and out the outlet port 58 before being returned to reservoir 62 through conduit 64.

When an operator desires to stop the vehicle, an input force is applied to pedal 150 which will move the actuation push rod 148 for operating the control valve in the pneumatic power assist apparatus 12. When the control valve is actuated, air from the atmosphere will enter the first 34 and second 36 rear chamber area to create a pneumatic pressure differential across the first 26 and second 28 wall means with the first 30 and second 32 front chamber area. The pneumatic pressure differential will provide a force which will act through the reaction disc 82 to move the push rod 98 through the cylindrical section 80 of the piston means 78. Plunger 140, which is attached to this control valve, will simultaneously provide actuation pin 138 with an input force which will cause valve means 112 to move as a unit toward seat 131 to restrict the flow of the hydraulic fluid from the inlet chamber 84 to the outlet chamber 86. The restriction of te hydraulic flow through the valve means 112 will create a hydraulic pressure differential across the land 88 of the piston means 78 between the inlet chamber 84 and the outlet chamber 86. This hydraulic pressure differential will provide a force which will act on the land 88 and move the push rod 98 into the master cylinder with a corresponding operational force.

This lower hydraulic pressure, as established in the outlet chamber 86 will pass through the axial opening 132 into slot 122 for communication to the reaction chamber 110. Since a higher hydraulic fluid pressure is present in the control chamber 108, a reaction pressure differential will be created across the disc means 120 of the valve means 112. As the input force from the operator increases and is transmitted through pin 138 to move poppet 130 toward the seat 131, the hydraulic pressure differential will also increase as the cross sectional area through the bore 104 is reduced. Since this same hydraulic pressure differential is experienced across the disc 120, at some predetermined level, spring 126 will be overcome to allow the disc 120 to move on the stem 114 to limit the flow restriction through the bore 104. This will prevent an interruption of the hydraulic fluid flow from the pump 63 which is required to operate the open center power steering gear 66.

Thus, the master cylinder simultaneously receives the output from a pneumatic and a hydraulic power apparatus to provide the brakes 18 and 20 on the vehicle with an actuation force sufficient to bring the vehicle to a stop within the requirements set forth in Section 105(a) of the Department of Transportation standards for acceptable braking systems.

When the input force is removed from the pedal 150, spring 134 will move the poppet 130 and disc 120 against shoulder 136 to re-establish equal pressures in the inlet chamber 84 and the outlet chamber 86. At the same time, the control valve in the pneumatic power assist apparatus 12, will interrupt the communication of air to the first 34 and second 36 rear chamber areas and re-establish vacuum communication therethrough to equalize the pressure across the first 26 and second 28 wall means and eliminate the pneumatic pressure differential. With the elimination of the pneumatic pressure differential, return spring 94 will move the first 26 and second 28 wall means toward the rear shell 22.

During activation of the control valve, the pneumatic pressure differential may be so rapidly produced that the hydraulic pressure differential is not established as the land 88 is moved through the outlet chamber 86. To prevent any opposition of movement therein, hydraulic fluid can flow through check valve 156 located in axial passage 158 until such time as the hydraulic pressure differential is established.

In some installations it may be necessary to provide an auxiliary source of pressurizing for the hydraulic fluid utilized in the braking system, such as when the engine is not operating. To meet this requirement, I have provided an electric pump 160 which can be connected to the housing 52 through an inlet port 162 and an outlet port 164. A pressure actuation switch 166 is located in the hydraulic supply conduit 65 between the pump 63 and the power steering gear 66 to provide an actuation signal for activating the electric pump 160. A check valve 168 in conduit 60 will prevent fluid from flowing to the power steering gear 66 when the electric pump 160 is operating in the same manner as check valve 170 prevents the hydraulic fluid from flowing to the electric pump 160 when pump 63 is operating. A relief valve 172 located in the hydraulic return conduit 64 will maintain a residual pressure in the outlet chamber to assure that there is sufficient hydraulic fluid present for the electric pump 160 to become operational. Thus, when the motor is stopped, and pressure actuation switch 166 is activated, the electric pump 160 will be turned on and provide the hydraulic fluid in the hydraulic power assist apparatus 14 with a flow pressure sufficient to produce a hydraulic pressure differential upon movement of the valve means 112 by an input force transmitted through plunger 140.

For some vehicles presently equipped with manual brakes in order to meet the requirements set forth in Section 105 (a) of the Federal Highway and Transportation act, it may only be necessary to incorporate a hydraulic power assist apparatus 14. As shown in FIG. 3, the input push rod 148 is directly connected to the actuation pin 138 through the piston means 78. The push rod 148 has a spherical end 170 which is retained in an annular groove 172 by a retainer 174. The manual input to the push rod 148 will move the spherical end 170 in the slot to provide movement for the valve means 114 in the piston means 78. As described in the operation of the embodiment in FIG. 2, the valve means 114 moves as a unit toward the seat 131 to restrict the flow of hydraulic fluid between the inlet chamber 84 and the outlet chamber 86. This restriction in the hydraulic fluid flow will create a hydraulic pressure differential between the inlet chamber 84 and the outlet 86 across the land 88 on the piston means 78. This hydraulic pressure differential will move the piston means 78 by acting on land 88. As the hydraulic pressure differential is created across the land 88, the outlet chamber pressure is communicated to the reaction chamber 110 through slot 122 in the stem 114 to establish a reaction pressure differential across the disc 120. When some predetermined reaction pressure differential is reached, spring 126 will allow the disc 120 and associated poppet 130 to move on the stem 114 as the input applied through pin 138 moves the stem 114 toward the seat 131. Thus, the restriction of the flow of the hydraulic fluid is limited to the resiliency of the spring 126 and as such the flow to the open center power steering gear 66 will never be completely interrupted.

I claim:

1. A power braking apparatus for use in a vehicle comprising:

a first housing having a first cavity therein;

wall means for dividing the first housing into a first chamber area and a second chamber area, said first and second chamber areas being connected to receive a first source of fluid;

actuating means responsive to an operator;

first valve means connected to said wall means and moved by said actuating means for sequentially interrupting the communication of said first fluid to said second chamber area and allowing a second source of fluid to be communicated to said second chamber area to create a first pressure differential across the wall means with the first source of fluid in the first chamber, said first pressure differential moving said wall means to produce a first output force;

a second housing having a second cavity therein;

piston means connected to said wall means and extending into said second cavity for transmitting said first output force to a force responsive member, said piston means having a peripheral surface which separates the second cavity into a third chamber and a fourth chamber, said third chamber being connected to a third source of fluid, said piston means having a passageway therethrough to allow said third source of fluid to flow into the fourth chamber and return to the origin of said third source of fluid;

second valve means located in said passageway and responsive to said actuating means for proportionally restricting the communication through said passageway to create a second pressure differential between the third chamber ad the fourth chamber, said second pressure differential acting on said peripheral surface to provide a second output force which is added to said first output force for operating said force responsive member;

first resilient means located in said passageway between said second valve means and the actuating means for limiting the restriction of said third source of fluid through the passageway to avoid an interruption of the return of said third source of fluid to said origin;

disc means connected to said first resilient means, said disc means separating said passageway into a control chamber and a reaction chamber, said control chamber being connected to said third chamber;

pin means extending through said disc means and into the reaction chamber, said pin means having an axial bore for connecting said reaction chamber with the fourth chamber; and keeper means connected to said pin means for holding said resilient means against said disc means, said second pressure differential being established across said disc means for urging said pin means into engagement with said actuation means to provide an operator with an indication of the second output force.

2. The power braking apparatus, as recited in claim 1, wherein said second valve means further includes:
poppet means located in said control chamber and connected to said disc means, said actuating means in moving said first valve means urging said poppet means toward a seat to proportionally change the cross sectional area of the flow path between the control chamber and the fourth chamber through said passageway.

3. The power braking apparatus, as recited in claim 2, wherein said second valve means further includes:
second resilient means located in said passageway for urging said poppet means toward said disc means.

4. The power braking apparatus, as recited in claim 3, wherein said second valve means further includes:
stem means located between said pin means and said actuating means, said stem means transmitting the input force to move the disc means toward the control chamber to establish said change in cross sectional area of the flow path of said third source of fluid to establish said second pressure differential.

5. The power braking apparatus, as recited in claim 4, wherein said second housing includes:
an inlet port connected to an auxiliary source of said third fluid under pressure to provide a backup source of braking potential if a malfunction should occur in the first source of said third fluid under pressure.

6. The power braking apparatus, as recited in claim 1, wherein said piston means includes:
an axial opening therethrough; and
check valve means located in said axial opening for preventing communication between the third chamber and the fourth chamber and for allowing communication between the fourth chamber and the third chamber upon said actuating means rapidly moving said first valve means which permits said first pressure differential to develop the first output force before the third fluid source can develop said second pressure differential.

7. The power braking apparatus as recited in claim 1 wherein said keeper means includes:
adjustment means for varying the preload on said first resilient means to preselect the limit for said restriction of the flow of the third source of fluid.

8. A power braking apparatus for use in a vehicle comprising:
a housing having an axial bore therein with an inlet port and an outlet port, said inlet port being connected to a first conduit containing a source of fluid under pressure, said outlet port being connected to a second conduit returning said fluid under pressure to reservoir;

piston means located in said axial bore for establishing an inlet chamber adjacent said inlet port and an outlet chamber adjacent said outlet port, said piston means having a first passageway therethrough for connecting said inlet chamber with said outlet chamber;

valve means for regulating the flow of said fluid under pressure through the first passageway from the inlet chamber into the outlet chamber;

disc means located in said first passageway for establishing a control chamber and a reaction chamber, said control chamber being in direct communication with said inlet chamber and said reaction chamber being in connection with said outlet chamber;

stem means extending through said disc means and having a head on a first end and a second end, said first end being located in said control chamber, said first end having an axial slot therein through which the outlet chamber is communicated with the reaction chamber;

input means connected to said piston means and responsive to an operational input force for moving said valve means toward a seat in said first passageway to restrict the flow of said fluid under pressure from the inlet chamber to the outlet chamber to establish a pressure differential therebetween, said pressure differential moving said piston means to establish an output force;

resilient means located in said first passageway and connected to said valve means to limit the restriction of the flow of said fluid under pressure to the outlet chamber to avoid an interruption of the flow of the fluid in said second conduit; and keeper means secured to said second end of said stem means for holding said resilient means against said disc means, said pressure differential acting on said disc means to provide a reactionary force opposing the operational input force.

9. The power braking apparatus, as recited in claim 8, wherein said valve means further includes:
poppet means surrounding said head of the stem means and having a tapered surface thereon for engagement with a seat in the passageway, said poppet means having an axial opening through which the outlet chamber is communicated into the reaction chamber.

10. The power braking apparatus, as recited in claim 9, wherein said valve means further includes:
spring means for biasing said poppet means against said disc means and said disc means against a stop in the passageway for allowing said fluid under pressure to flow unrestricted in the absence of an operational input force.

11. The power braking apparatus, as recited in claim 8, wherein said input means includes:

a push rod connected to a pedal, said input force being applied by an operator through said pedal; and pin means retained in said piston means for transmitting said operational input force from said push rod to said valve means.

12. The power braking apparatus, as recited in claim 8, wherein said piston means includes:

a second passageway for connecting the outlet chamber with the inlet chamber; and check valve means located in said second passageway for preventing said fluid under pressure from flowing from the inlet chamber to the outlet chamber, said check valve means allowing said fluid under pressure in the outlet chamber to be communicated to the inlet chamber if the rate of movement of the piston means in response to the operational input force exceeds said pressure differential.

* * * * *